(12) United States Patent
Lee et al.

(10) Patent No.: US 9,391,525 B2
(45) Date of Patent: Jul. 12, 2016

(54) POWER SYSTEM SWITCH PROTECTION USING OUTPUT DRIVER REGULATION

(71) Applicant: iWatt Inc., Campbell, CA (US)

(72) Inventors: Andrew Kwok-Cheung Lee, Union City, CA (US); Jiang Chen, Cupertino, CA (US); Yong Li, San Jose, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 225 days.

(21) Appl. No.: 14/032,047

(22) Filed: Sep. 19, 2013

(65) Prior Publication Data

US 2014/0085940 A1    Mar. 27, 2014

Related U.S. Application Data

(60) Provisional application No. 61/704,838, filed on Sep. 24, 2012.

(51) Int. Cl.
*H02M 3/335*    (2006.01)
*H02M 1/00*    (2006.01)

(52) U.S. Cl.
CPC ...... *H02M 3/33507* (2013.01); *H02M 3/33523* (2013.01); *H02M 2001/0006* (2013.01)

(58) Field of Classification Search
CPC .............. H02M 3/33507; H02M 2001/32; H02M 1/34; H02M 2001/0006; H02M 3/33523

USPC ................... 323/276; 361/18, 88–92
See application file for complete search history.

(56) References Cited

U.S. PATENT DOCUMENTS

| | | | | |
|---|---|---|---|---|
| 5,581,453 A * | 12/1996 | Ueta | ........................ | G05F 1/66 363/131 |
| 6,587,357 B1 * | 7/2003 | Halamik | ........... | H02M 3/33507 363/20 |
| 7,136,292 B1 * | 11/2006 | Chan | ....................... | H02M 1/36 363/21.09 |
| 7,221,128 B2 * | 5/2007 | Usui | ................. | H02M 3/33507 323/207 |
| 2004/0124716 A1 * | 7/2004 | Shirato | ................. | H02J 7/0065 307/130 |
| 2007/0171683 A1 * | 7/2007 | Sukup | ..................... | H02M 1/36 363/21.04 |
| 2010/0309690 A1 * | 12/2010 | Kawabe | ............ | H02M 3/33507 363/21.01 |
| 2012/0025608 A1 * | 2/2012 | Melanson | ............... | H02M 1/36 307/24 |
| 2015/0023070 A1 * | 1/2015 | Nate | ................ | H02M 3/33507 363/21.17 |

* cited by examiner

*Primary Examiner* — Gary L Laxton
*Assistant Examiner* — Kyle J Moody
(74) *Attorney, Agent, or Firm* — Fenwick & West LLP

(57) ABSTRACT

A controller of a switching power converter includes a voltage protection circuit that generates a modified supply voltage that does not exceed a predetermined threshold voltage to power one or more components of the controller.

7 Claims, 6 Drawing Sheets

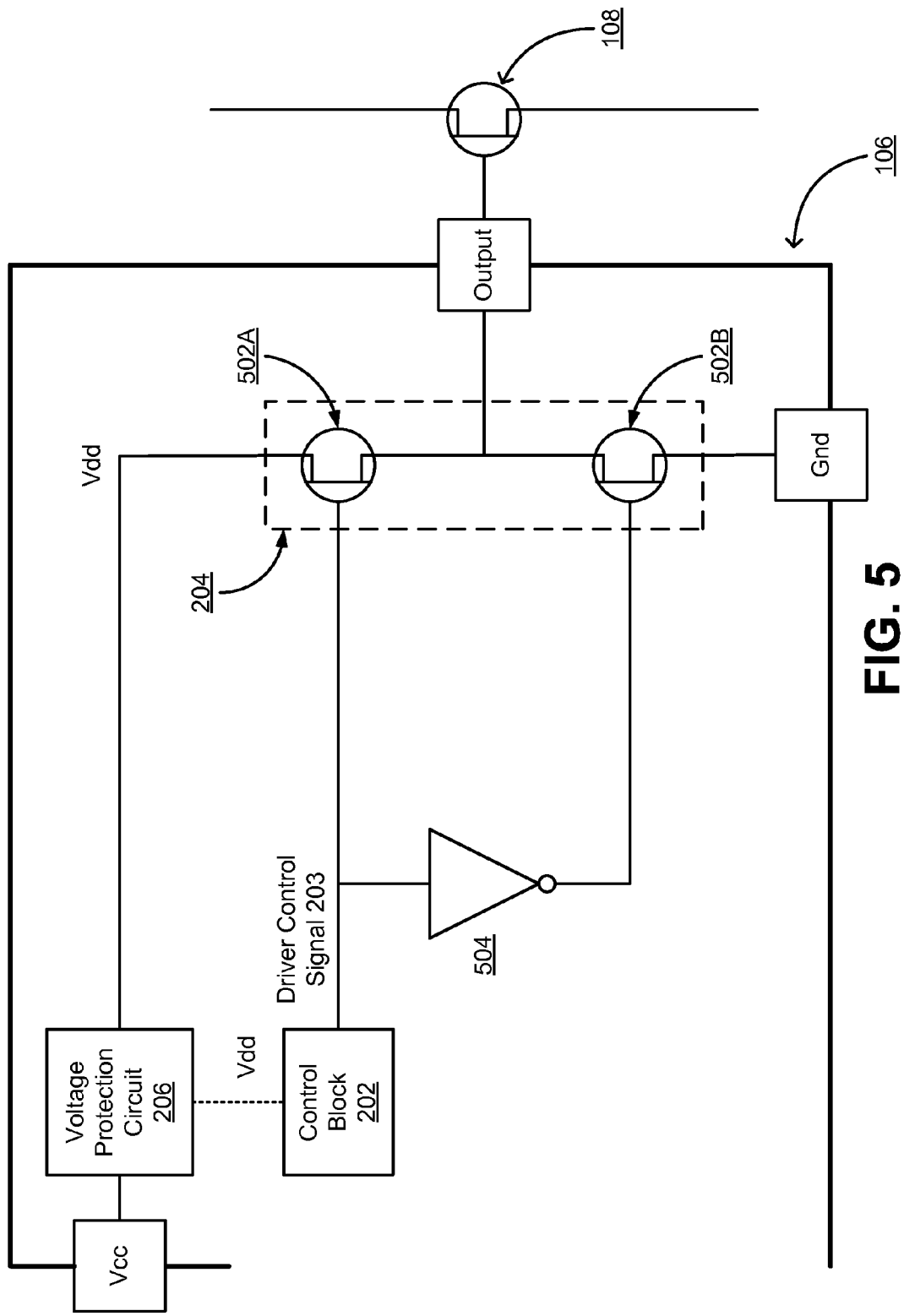

POWER SYSTEM SWITCH PROTECTION USING OUTPUT DRIVER REGULATION

CROSS-REFERENCE TO RELATED APPLICATION

This application claims priority under 35 U.S.C. §119(e) from U.S. Provisional Patent Application No. 61/704,838, entitled "Power System Switch Protection Using Output Driver Regulation," filed on Sep. 24, 2012, which is incorporated by reference herein in its entirety.

BACKGROUND OF THE INVENTION

The present invention relates to regulating the output voltage of a driver in a controller of a switch mode power converter to protect a power switch in the switch mode power converter.

A switch mode power converter—commonly used in low power AC-DC power supplies—includes a power switch, and a controller that controls the operation of the power switch. The power switch frequently has a specified maximum rated control voltage for safe and reliable operation. A control voltage, provided to the power switch, that exceeds the specified maximum rated voltage can damage or otherwise detrimentally affect the reliability of the power switch. Accordingly, to ensure safety and reliability of the power switch, the control voltage provided to the power switch of a switch-mode power converter needs to be limited to a value below the maximum rated control voltage.

Conventionally, a zener diode connected between the control terminal of the power switch and a voltage ground serves to limit the control voltage of the power switch to a value corresponding to a zener breakdown voltage, set to be lower than the maximum rated control voltage of the switch. However, at high operating control voltages, the zener diode, while limiting the control voltage to the zener breakdown voltage value, sinks large currents and contributes to power loss and operating inefficiency.

SUMMARY

Embodiments herein include a controller of a switch-mode power converter that comprises a voltage protection circuit generating a modified supply voltage that does not exceed a predetermined threshold voltage to power one or more components of the controller. In one embodiment, a switching power converter comprises a transformer coupled between an input voltage and an output of the switching power converter, the transformer including a primary winding coupled to the input voltage and a secondary winding coupled to the output of the switching power converter, a switch coupled to the primary winding of the transformer, current through the primary winding being generated while the switch is turned on and not being generated while the switch is turned off, and a controller configured to generate a control signal to turn on or turn off the switch, the switch being turned on responsive to the control signal being in a first state and the switch being turned off responsive to the control signal being in a second state. The controller includes a voltage protection circuit configured to receive a supply voltage and to generate a modified supply voltage to power one or more components of the controller. The modified supply voltage may be substantially equal to the supply voltage if the supply voltage is lower than a predetermined threshold voltage, and the modified supply voltage may be substantially equal to a predetermined supply voltage if the supply voltage is greater than the predetermined threshold voltage.

The predetermined supply voltage may be any voltage that may or may not have any relation to the predetermined threshold voltage. In one embodiment, the predetermined supply voltage is substantially equal to the predetermined threshold voltage or substantially equal to such predetermined threshold voltage scaled by a predetermined scaling constant. In one embodiment, the predetermined supply voltage is lower than a rated voltage that allows safe operation of the switch of the switching power converter.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The teachings of the embodiments of the present invention can be readily understood by considering the following detailed description in conjunction with the accompanying drawings.

FIG. 5 illustrates the internal circuitry of the controller of the AC to DC flyback switching power supply, according to one embodiment.

DETAILED DESCRIPTION OF EMBODIMENTS

The Figures and the following description relate to the preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
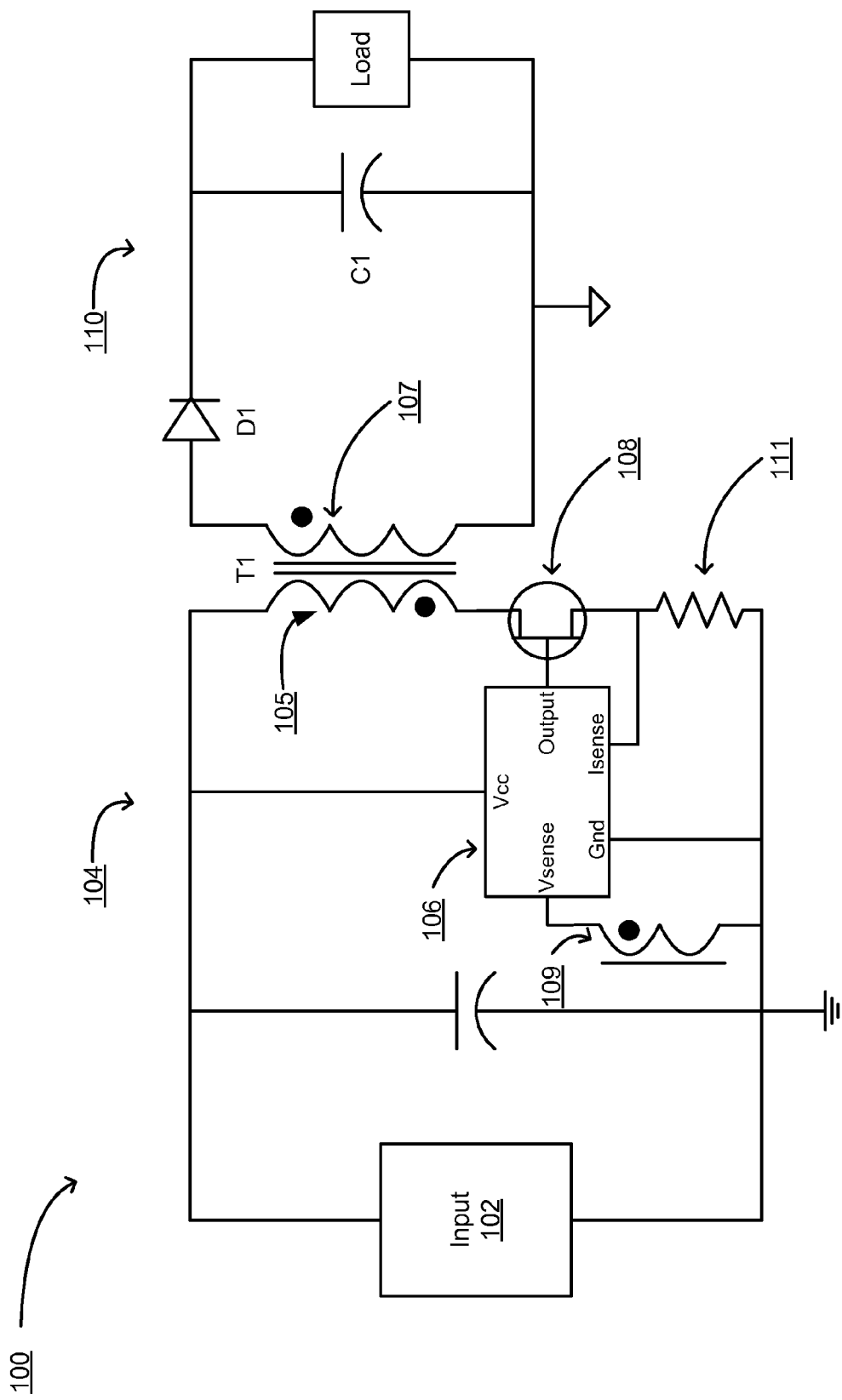
FIG. 1 illustrates an AC to DC flyback switching power supply, according to one embodiment.

FIG. 1 illustrates an exemplary power converter 100 in accordance with one embodiment of the present invention. As illustrated, the power converter 100 is an AC to DC flyback switch-mode power supply, but other topologies of switch-mode power converters can be designed in accordance with the voltage protection circuit and other teachings described herein. The power converter 100 includes three principal sections, i.e., an input stage 102, a power stage 104, and a secondary stage 110.

The input stage 102 provides an input voltage to the power stage 104. In one embodiment, the input stage 102 includes a bridge rectifier (not shown) connected to an AC voltage source (not shown) and outputs a rectified but unregulated DC input voltage. The input voltage is applied to the supply voltage pin Vcc of the controller 106 and to the primary winding 105 of power transformer T1.

The power stage 104 comprises power transformer T1, a controller 106, and a switch 108. The power transformer T1 includes a primary winding 105, a secondary winding 107, and an auxiliary winding 109. The controller 106 maintains output regulation via control of the ON and OFF states of power switch 108 via a control signal output from the Output pin of controller 106. The controller 106 can employ any one of a number of well known modulation techniques, such as pulse-width-modulation (PWM) or pulse-frequency-modulation (PFM), and/or their combinations, to control the ON and OFF states and duty cycles of power switch 108. In one embodiment, the controller 106 is an application-specific integrated circuit (ASIC).

The control signal generated by the controller 106 (e.g., at the Output pin) drives a control terminal of the power switch 108 (alternatively referred to herein as switch 108). As illustrated in FIG. 1, the switch 108 is an n-type metal-oxide-semiconductor field-effect transistor (alternatively referred to herein as a MOSFET), so the control terminal is the gate (G) terminal of the switch 108. The drain (D) of the switch 108 is connected in series with the primary winding 105, and the source (S) of switch 108 is connected to the $I_{SENSE}$ pin of controller 106 and to ground via a sense resistor 111. In other embodiments, the switch 108 can be another type of transistor such as a bipolar junction transistor (BJT) or any other device capable of opening or closing a circuit in a controlled manner. The ground pin (Gnd) of the controller 106 is connected to ground.

The $I_{SENSE}$ pin senses a primary-side current flowing through the primary winding 105 and switch 108 in the form of an analog voltage across sense resistor 111. In some embodiments, sensing the primary-side current of the flyback switching power at the $I_{SENSE}$ pin of the converter 106 allows for cycle-by-cycle peak current control as well as precise constant current control for output current through the load.

MOSFETs typically have a maximum recommended gate voltage for safe and proper operation; the functionality and reliability of a MOSFET can be jeopardized if a voltage provided to the gate of the MOSFET exceeds the maximum recommended gate voltage. Furthermore, in some embodiments, the supply voltage Vcc of the controller 106 is received directly from the unregulated input stage 102, and may be subject to fluctuations. Fluctuations in the supply voltage Vcc to the controller 106 may propagate to the gate of the MOSFET power switch 108 and compromise reliability and functionality of the power switch 108.

Thus, controller 106 includes a voltage protection circuit (described further with reference to FIGS. 2-6 below) that is configured to prevent the control signal (e.g., the signal generated at the Output pin of controller 106) from exceeding the maximum recommended gate voltage of the MOSFET power switch 108 during a fluctuation or spike in the supply voltage Vcc.

In general, most switching devices become unreliable when the voltage at their control terminal exceeds a certain maximum recommended (or rated) operating voltage, so the subject matter described herein may also be applicable in embodiments where the power switch is a different type of electronic component (e.g., a BJT, also referred to as a bipolar junction transistor).

Returning to the components of the power converter 100, the secondary stage 110 of the power converter 100 includes the secondary winding 107, a diode D1, and a capacitor C1. The diode D1 functions as an output rectifier and the capacitor C1 functions as an output filter. The resulting regulated output voltage is delivered to the load.

As shown by FIG. 1, the output voltage across the secondary winding 107 is reflected by the voltage across an auxiliary winding 109, which is input to the $V_{SENSE}$ pin of controller 106. In one embodiment, the voltage at the $V_{SENSE}$ pin provides feedback to the controller 106 indicating the voltage on the secondary winding 107 for use in controlling the operation of switch 108. In some embodiments, sensing the output voltage (e.g., voltage across the load) as reflected across the auxiliary winding 109 at the $V_{SENSE}$ pin allows for precise output voltage regulation.

Figure 2A:
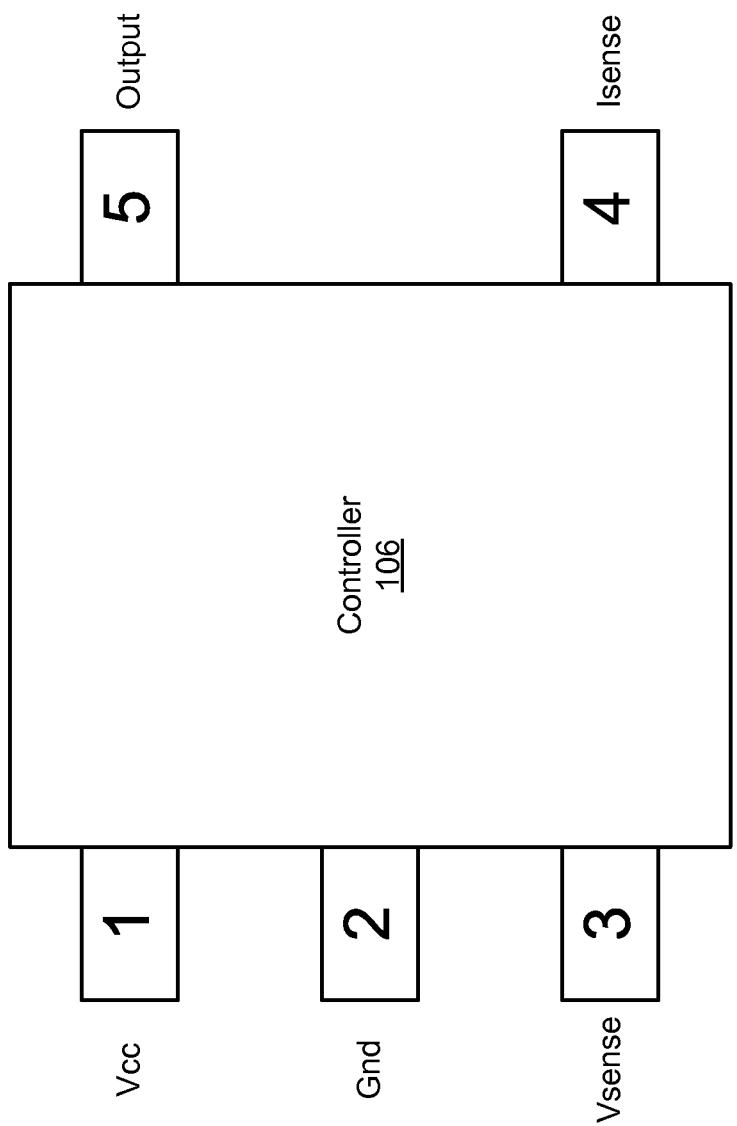
FIG. 2A illustrates the pin-outs of the controller IC of the AC to DC flyback switching power supply, according to one embodiment.

FIG. 2A illustrates the pin-outs of the controller IC 106 according to one embodiment. The controller IC 106 is a 5-pin integrated circuit (IC) that performs the functions of controller 106. Pin 1 (Vcc) is a power input pin for receiving the supply voltage, pin 2 (Gnd) is a ground pin, pin 3 ($V_{SENSE}$) is an analog input pin configured to receive the voltage across the auxiliary winding 109 of the flyback switching power supply for primary-side regulation of the output voltage, pin 4 ($I_{SENSE}$) is an analog input pin configured to sense the primary-side current of the flyback switching power supply in the form of an analog voltage across sense resistor 111. Pin 5 (Output) is an output pin outputting a control signal for controlling the on-times and off-times of the power switch 108.

Figure 2B:
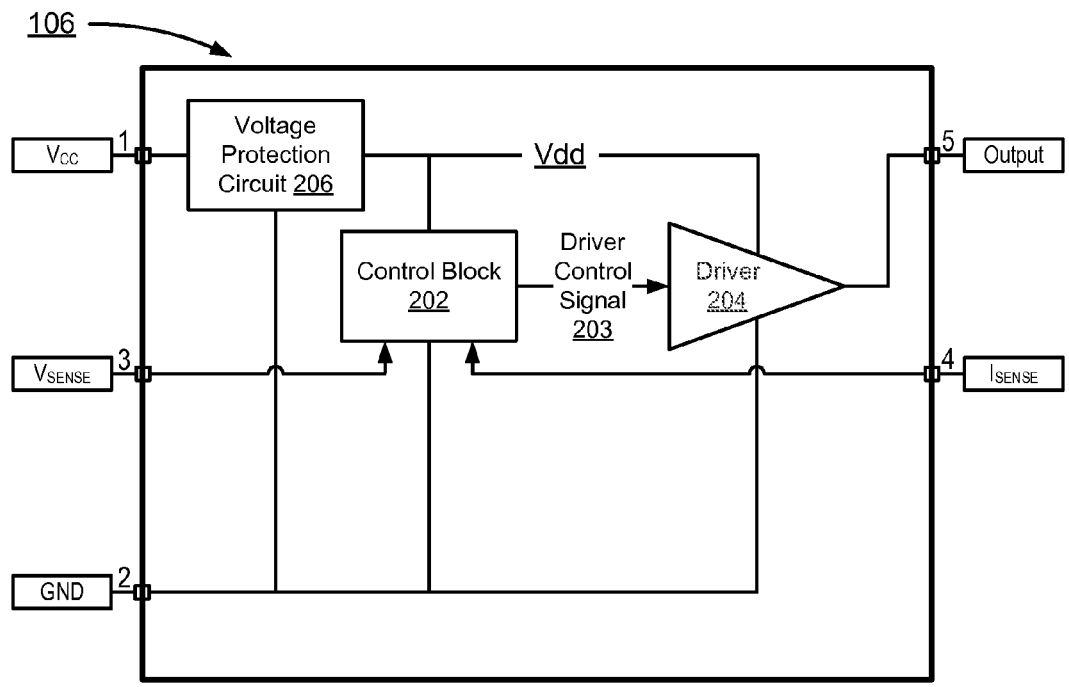
FIG. 2B illustrates the internal circuitry of the controller IC of the AC to DC flyback switching power supply in more detail, according to one embodiment.

FIG. 2B illustrates the internal circuitry of the controller 106, according to one embodiment. The controller 106 includes a control block 202, a driver 204, and a voltage protection circuit 206. The controller 106 receives analog signals $V_{SENSE}$ (e.g., at pin 3 of the controller IC 106) and the $I_{SENSE}$ voltage (e.g., at pin 4 of the controller IC 106); and adaptively processes these received analog signals to generate the control signal (e.g., as Output at pin 5 of the controller IC 106).

The control block 202 receives the voltage feedback signal $V_{SENSE}$ and the current feedback signal $I_{SENSE}$ and generates a digital driver control signal 203 that governs the operation and on/off states of the switch 108. In some embodiments, the control block 202 includes a digital state machine for implementing one or more control schemes for regulating the operation of the power converter based on $V_{SENSE}$ and $I_{SENSE}$. In these embodiments, the control block 202 also includes conditioning circuits that convert the analog signals $V_{SENSE}$ and $I_{SENSE}$ into corresponding digital signals. In general, the control block 202 can implement any number of control schemes suitable for switch-mode power converters 100, such as pulse-width-modulation (PWM) or pulse-frequency-modulation (PFM), and/or their combinations.

The driver 204 receives the digital driver control signal 203 from the control block 202 and generates a control signal that is output via the Output pin (pin 5) of controller 106 to control the power switch 108. In one embodiment, the driver 204 outputs a control signal that causes the power switch 108 to turn on when the digital driver control signal 203 is high, and the driver 204 outputs a control signal that causes the power switch 208 to turn off when the digital driver control signal 203 is low.

The supply voltage Vcc may have fluctuations that cause the supply voltage to transiently go above a predetermined threshold voltage. Such voltage transients, if present in the supply voltage to the controller, may propagate to a gate of the power switch 108 and damage the power switch 108 (or otherwise adversely impact reliability of the power switch 108) by causing the gate voltage of the power switch 108 to exceed a maximum recommended (or rated) operating voltage.

In order to prevent such damage to the power switch 108, the voltage protection circuit 206 receives the supply voltage Vcc from pin 1 and provides a modified supply voltage Vdd. The voltage protection circuit 206 monitors the supply voltage Vcc and clamps the modified supply voltage Vdd when a high-voltage transient fluctuation or surge is detected in the supply voltage Vcc that causes the supply voltage to exceed a predetermined threshold voltage. The modified supply voltage Vdd may be clamped to any predetermined supply voltage, such as the predetermined threshold voltage or a voltage substantially equal to such predetermined threshold voltage scaled by a predetermined scaling constant, or to any other predetermined supply voltage that may or may not have any relation to the predetermined threshold voltage. In one embodiment, the predetermined supply voltage is lower than a rated voltage that allows safe operation of the switch 108 of the switching power converter.

The components and operation of the voltage protection circuit 206 are described in more detail below with reference to FIGS. 3A-3B.

Figure 2C:
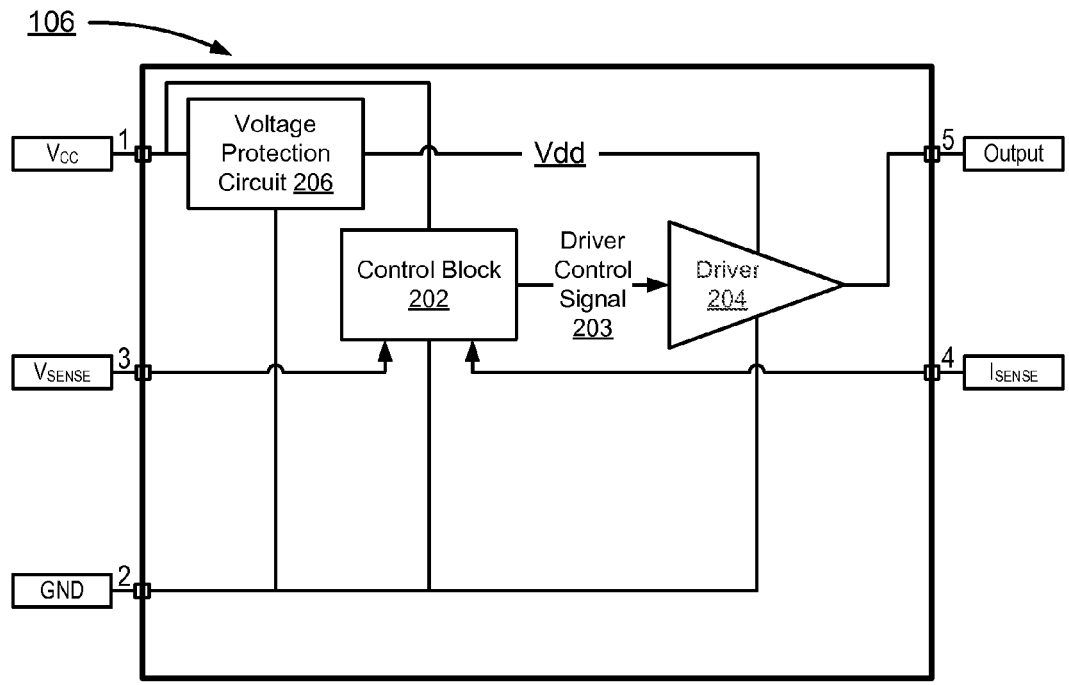
FIG. 2C illustrates the internal circuitry of the controller IC of the AC to DC flyback switching power supply in more detail, according to another embodiment.

In the embodiment illustrated in FIG. 2B, the voltage protection circuit 206 provides the modified supply voltage Vdd to both the control block 202 and the driver 204, which protects both components 202 and 204 from surges in the supply voltage Vcc. On the other hand, as shown in FIG. 2C, in some embodiments, the voltage protection circuit 206 provides the modified supply voltage Vdd to the driver 204 but not to the control block 202. Rather, control block 202 is powered by supply voltage Vcc directly. In both embodiments, the modified supply voltage Vdd beneficially prevents the driver 204 from outputting a control signal that exceeds the maximum recommended (e.g., rated) gate voltage of the power switch 108.

In the embodiments illustrated in FIGS. 2A-2C, the controller 106 is embodied as a single application-specific integrated circuit (controller IC 106). However, the functions of the controller 106 may alternatively be implemented with multiple integrated circuits or other components. For example, in embodiments where the driver 204 dissipates significantly more heat than the other components of the controller 106, the driver 204 may be implemented as a separate component or as a plurality of discrete MOSFETs on a circuit board.

Figure 3A:
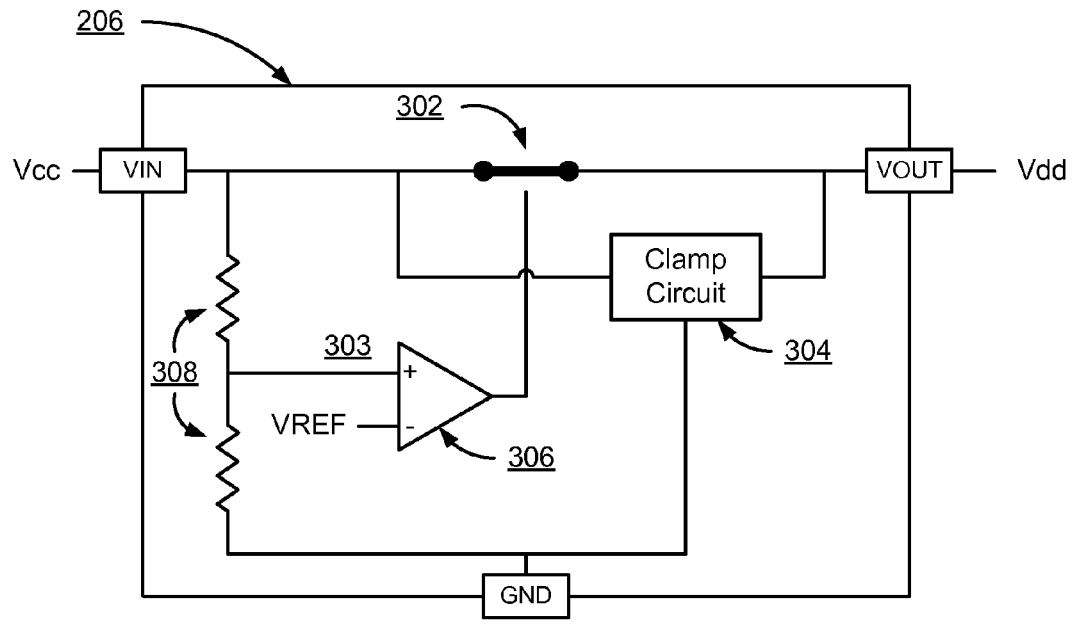
FIGS. 3A-3B illustrate the internal circuitry of the voltage protection circuit of the controller, according to one embodiment.
Figure 3B:
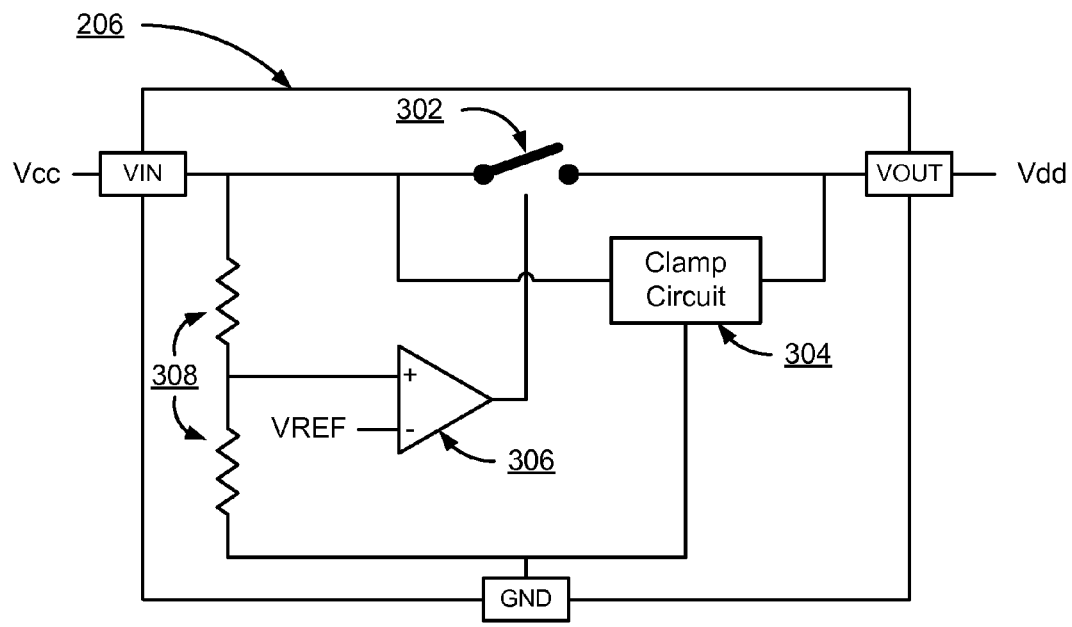

FIGS. 3A-3B illustrate the components of the voltage protection circuit 206, according to one embodiment. The voltage protection circuit 206 includes a mode selection switch 302, a clamp circuit 304, comparator 306, and a resistive voltage divider 308. The voltage protection circuit 206 receives the supply voltage Vcc at input terminal VIN and generates the modified supply voltage Vdd at output terminal VOUT.

The mode selection switch 302 operates in two modes—a closed mode and an open mode. The mode selection switch 302 operates in the closed mode when the supply voltage Vcc is lower than the predetermined voltage threshold. In the closed mode, as shown in FIG. 3A, the mode selection switch 302 is ON or closed, forming a direct electrical connection or path (e.g., an electrical short) between the input terminal VIN and the output terminal VOUT. As a result, the modified supply voltage Vdd is equal to the supply voltage Vcc when the mode selection switch 302 is in the closed mode.

On the other hand, the mode selection switch 302 operates in the open mode when the supply voltage Vcc is greater than the predetermined voltage threshold. In the open mode, as shown in FIG. 3B, the mode selection switch 302 is OFF or open, disconnecting the direct electrical connection or path between the input terminal VIN and the output terminal VOUT. Instead, in the open mode of the mode selection switch 302, when the supply voltage Vcc is greater than the predetermined voltage threshold, the modified supply voltage Vdd is generated from the supply voltage Vcc by limiting the supply voltage Vcc to a predetermined supply voltage by means of the clamp circuit 304. The modified supply voltage Vdd may be clamped to any predetermined supply voltage, such as the predetermined threshold voltage or a voltage substantially equal to such predetermined threshold voltage scaled by a predetermined scaling constant, or to any other predetermined supply voltage that may or may not have any relation to the predetermined threshold voltage. In one embodiment, the predetermined supply voltage is lower than the maximum rated voltage that allows safe operation of the switch 108 of the switching power converter.

The clamp circuit 304, also known in the art as a clamper, may be any electronic circuit that prevents an input signal from exceeding a certain threshold value by limiting the input signal to the certain threshold, here the predetermined supply voltage as described above. The clamp circuit 308 can thus be used to provide modified supply voltage Vdd that would not cause the control voltage (or Output as shown in FIGS. 2B-2C) generated by the controller 106 to exceed the maximum recommended gate voltage of the switch 108 when the supply voltage Vcc exceeds the predetermined voltage threshold.

Comparator 306 receives a comparator input 303 via the resistive voltage divider 308. The comparator input 303 is a scaled-down representation of the supply voltage Vcc. The comparator 306 compares the comparator input 303 to a reference voltage VREF. The reference voltage VREF is set such that the output of comparator 306 would transition from low to high or high to low when the supply voltage Vcc increases above or decreases below a set voltage (e.g., corresponding to the predetermined threshold voltage), respectively. In some embodiments, the set voltage or the predetermined threshold voltage is below the maximum recommended gate voltage of the power switch 108.

Furthermore, the output of comparator 306 controls the mode of the mode selection switch 302. Specifically, when the supply voltage Vcc at terminal VIN is lower than the predetermined threshold voltage, the comparator input 303 is lower than the reference voltage VREF, and the comparator 306 output drives the mode selection switch 302 to the closed (ON) mode (shown in FIG. 3A). As a result, a direct connection is created between the input terminal VIN and the output terminal VOUT. This connection forms a direct, lossless electrical path (e.g., an electrical short circuit) between the input terminal VIN and the output terminal VOUT, and the voltage protection circuit 206 relays the supply voltage Vcc to the modified supply voltage Vdd.

On the other hand, when the supply voltage Vcc at terminal VIN is higher than the predetermined voltage threshold, the comparator input 303 is higher than the reference voltage VREF, and the comparator 306 output drives the mode selection switch 302 to the open (OFF) mode (shown in FIG. 3B). In this case, the supply voltage Vcc is routed to the input terminal of the clamp circuit 304.

The operation of the comparator 306 and the mode selection switch 302 thus allows the voltage protection circuit 206 to prevent fluctuations and surges in supply voltage Vcc from being transmitted to modified supply voltage Vdd, thereby providing a modified supply voltage Vdd that consistently remains below the maximum recommended gate voltage of the power switch 108. In addition, the use of the clamp circuit 304 allows the voltage protection circuit 206 to dissipate less power than a conventional voltage protection solution (e.g., using a Zener diode to shunt the driver).

Figure 4:
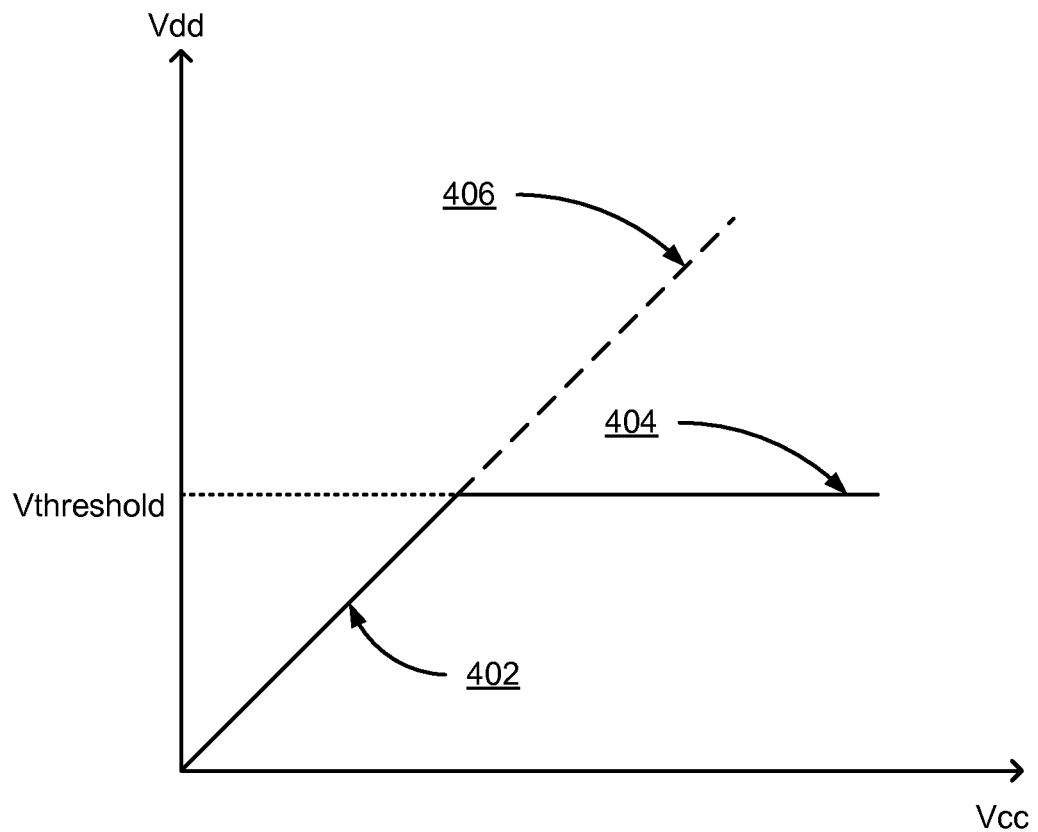
FIG. 4 illustrates input-output voltage characteristics of the voltage protection circuit, according to one embodiment.

FIG. 4 includes a graphical illustration of one example of the input-output voltage characteristics of the voltage protection circuit (e.g., a relationship between the supply voltage Vcc and the modified supply voltage Vdd). As shown in the portion 402 of the graph in FIG. 4, when the supply voltage Vcc is lower than the predetermined voltage threshold (Vthreshold), the modified supply voltage Vdd substantially tracks, follows or linearly trends with the supply voltage Vcc and is equal to the supply voltage Vcc. On the other hand, as shown in the portion 404 of the graph in FIG. 4, when the supply voltage Vcc is greater than the predetermined voltage threshold, the modified supply voltage Vdd is limited (e.g., clamped) to the predetermined voltage threshold and is equal to the predetermined voltage threshold. For the purpose of comparison alone, as shown in the portion 406 of the graph in FIG. 4, when the supply voltage Vcc is greater than the predetermined voltage threshold, the modified supply voltage Vdd is prevented from tracking or following the supply voltage Vcc.

While FIG. 4 illustrates one example embodiment in which the modified supply voltage Vdd is clamped to the predetermined threshold voltage, in other embodiments the modified supply voltage Vdd may be clamped to any other predetermined supply voltage, such as the predetermined threshold voltage or a voltage substantially equal to such predetermined threshold voltage scaled by a predetermined scaling constant, or to any other predetermined supply voltage that may or may not have any relation to the predetermined threshold voltage. In one embodiment, the predetermined supply voltage is lower than the maximum rated voltage that allows safe operation of the switch 108 of the switching power converter.

FIG. 5 illustrates internal components of the controller 106, according to some embodiments. The voltage protection circuit 206 receives supply voltage Vcc and generates modified supply voltage Vdd to power the driver 204 and optionally to power the control block 202.

As shown in FIG. 5, the driver 204 is implemented as a pair of MOSFETs 502A, 502B. In some embodiments, a first MOSFET 502A connects the Output pin of controller 106 to the modified supply voltage Vdd, and a second MOSFET 502B is coupled in series with the first MOSFET 502A and connects the Output pin to the ground pin. The output of the control block 202 is directly coupled to the gate of the first MOSFET 502A and is coupled to the gate of the second MOSFET 502B via an inverter 604. Driver 204 receives a driver control signal 203 from control block 202 and generates a control signal at the Output pin of controller 106 to turn on or off the switch 108. The control signal at the Output pin of controller 106 drives the control terminal (e.g., the gate) of the MOSFET switch 108.

In such embodiments, responsive to the driver control signal 203 being logic high (e.g., logic 1), MOSFET 502A is turned on and MOSFET 502B is turned off; the control signal at the Output pin is in a first state (e.g., logic high or logic 1) and the driver 204 turns on the switch 108 by powering it toward the modified supply voltage Vdd through MOSFET 502A. Conversely, responsive to the driver control signal 203 being logic low (e.g., logic 0), MOSFET 502A is turned off and MOSFET 502B is turned on; the control signal at the Output pin is in a second state (e.g., logic low or logic 0) and the driver 204 turns off the switch 108 by powering it toward the Gnd pin through MOSFET 502B.

Accordingly, in such embodiments, responsive to the control signal at the Output pin being in the first state, by powering the switch 108 toward the modified supply voltage Vdd, the voltage protection circuit 206 limits the voltage at the Output pin of controller 106, at maximum, to a value corresponding the modified supply voltage Vdd (which is set to be lower than the maximum recommended gate voltage of switch 108). This, in turn, prevents the voltage at the Output pin of the controller 106 from exceeding the maximum recommended gate voltage of the power switch 108.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

What is claimed is:

1. A switching power converter comprising:
    a transformer coupled between an input voltage and an output of the switching power converter, the transformer including a primary winding coupled to the input voltage and a secondary winding coupled to the output of the switching power converter;
    a switch coupled to the primary winding of the transformer, current through the primary winding being generated while the switch is turned on and not being generated while the switch is turned off; and
    a controller configured to generate a control signal to turn on or turn off the switch, the switch being turned on responsive to the control signal being in a first state and the switch being turned off responsive to the control signal being in a second state,
    wherein the controller includes a voltage protection circuit configured to receive a supply voltage and to generate a modified supply voltage, based on the received supply voltage, to power one or more components of the controller, wherein the supply voltage is the input voltage of the switching power converter, and wherein:
        the modified supply voltage is equal to the supply voltage, responsive to the supply voltage being lower than a predetermined threshold voltage; and
        the modified supply voltage is substantially equal to a predetermined supply voltage, responsive to the supply voltage being greater than the predetermined threshold voltage.

2. The switching power converter of claim 1, wherein the predetermined supply voltage is substantially equal to the predetermined threshold voltage.

3. The switching power converter of claim 1, wherein the predetermined supply voltage is substantially equal to the predetermined threshold voltage scaled by a predetermined scaling constant.

4. The switching power converter of claim 1, wherein the predetermined supply voltage is less than a maximum voltage that allows safe operation of the switch of the switching power converter.

5. The switching power converter of claim 1, further comprising a driver circuit powered by the modified supply voltage and configured to power the switch with the modified supply voltage responsive to the control signal being in the first state.

6. The switching power converter of claim 1, wherein the voltage protection circuit further comprises a clamp circuit configured to limit the modified supply voltage at the predetermined supply voltage responsive to the supply voltage being greater than the predetermined threshold voltage.

7. The switching power converter of claim 1, wherein the one or more components of the controller powered by the modified supply voltage include an output driver for driving the switch of the switching power converter.

* * * * *